(12) United States Patent
Merz et al.

(10) Patent No.: US 7,848,456 B2
(45) Date of Patent: Dec. 7, 2010

(54) WIRELESS DATA COMMUNICATION METHOD VIA ULTRA-WIDE BAND ENCODED DATA SIGNALS, AND RECEIVER DEVICE FOR IMPLEMENTING THE SAME

(75) Inventors: Roman Merz, Neuchâtel (CH); Cyril Botteron, Gals (CH); Pierre-André Farine, Neuchâtel (CH)

(73) Assignee: Institut de Microtechnique Université de Neuchâtel, Neuchâtel (CH)

( * ) Notice: Subject to any disclaimer, the term of this patent is extended or adjusted under 35 U.S.C. 154(b) by 1110 days.

(21) Appl. No.: 10/597,067

(22) PCT Filed: Dec. 21, 2004

(86) PCT No.: PCT/EP2004/014515

§ 371 (c)(1),
(2), (4) Date: Jul. 10, 2006

(87) PCT Pub. No.: WO2005/076032

PCT Pub. Date: Aug. 18, 2005

(65) Prior Publication Data

US 2007/0147476 A1 Jun. 28, 2007

(30) Foreign Application Priority Data

Jan. 8, 2004 (EP) .................................. 04000261

(51) Int. Cl.
*H04B 1/00* (2006.01)
(52) U.S. Cl. ........................ 375/310; 375/260; 375/272; 375/285; 375/296; 375/346; 455/422.1
(58) Field of Classification Search .................. 375/260, 375/159, 130
See application file for complete search history.

(56) References Cited

U.S. PATENT DOCUMENTS 5,337,054 A * 8/1994 Ross et al. ..................... 342/93

(Continued)

OTHER PUBLICATIONS

International Search Report issued in corresponding application No. PCT/EP2004/014515 completed Apr. 8, 2005 and mailed Apr. 18, 2005.

(Continued)

*Primary Examiner*—Chieh M Fan
*Assistant Examiner*—Santiago Garcia
(74) *Attorney, Agent, or Firm*—Griffin & Szipl, P.C.

(57) ABSTRACT

This invention concerns a wireless data communication method, wherein a transmitter device having a first wide band antenna transmits ultra-wide band coded data signals to a receiver device having a second wide band antenna for receiving the direct and/or multiple path coded data signals. The transmitted data is defined by one or several sequences of N pulses where N is an integer number greater than 1. The arrangement of the N pulses of each sequence represents a data coding relative to the transmitter device. The N pulses of a sequence of direct and/or multiple path coded data signals received by the receiver device are processed each in one among N corresponding reception time windows. Each of the N reception time windows is positioned in time based on a known theoretic arrangement of the N pulses of signals transmitted by the transmitter device. An adding operation of the N windows is then performed in the receiver device so that the amplitude level of the constantly added pulses is higher than the amplitude level of the noise sensed by the receiver device.

20 Claims, 8 Drawing Sheets

U.S. PATENT DOCUMENTS

| | | | |
|---|---|---|---|
| 5,684,920 A * | 11/1997 | Iwakami et al. | 704/203 |
| 6,483,461 B1 * | 11/2002 | Matheney et al. | 342/463 |
| 6,529,568 B1 * | 3/2003 | Richards et al. | 375/346 |
| 6,552,677 B2 * | 4/2003 | Barnes et al. | 342/22 |
| 6,556,621 B1 * | 4/2003 | Richards et al. | 375/150 |
| 6,636,566 B1 * | 10/2003 | Roberts et al. | 375/247 |
| 6,717,992 B2 * | 4/2004 | Cowie et al. | 375/316 |
| 6,952,456 B1 * | 10/2005 | Aiello et al. | 375/295 |
| 7,164,722 B2 * | 1/2007 | Takamura | 375/259 |
| 7,269,427 B2 * | 9/2007 | Hoctor et al. | 455/456.2 |
| 7,313,127 B2 * | 12/2007 | Hoctor et al. | 370/350 |
| 7,397,870 B2 * | 7/2008 | Batra et al. | 375/340 |
| 7,411,758 B1 * | 8/2008 | Cheung et al. | 360/75 |
| 7,436,909 B2 * | 10/2008 | Sahinoglu et al. | 375/340 |
| 7,492,811 B2 * | 2/2009 | Richards et al. | 375/150 |
| 2002/0133334 A1 * | 9/2002 | Coorman et al. | 704/211 |
| 2002/0176511 A1 * | 11/2002 | Fullerton et al. | 375/285 |
| 2003/0002347 A1 | 1/2003 | Seki et al. | |
| 2003/0035465 A1 * | 2/2003 | Takamura | 375/141 |
| 2003/0058963 A1 * | 3/2003 | Cattaneo et al. | 375/316 |
| 2003/0095609 A1 * | 5/2003 | Cowie et al. | 375/316 |
| 2003/0198308 A1 | 10/2003 | Hoctor et al. | |

OTHER PUBLICATIONS

International Preliminary Examination Report issued in corresponding application No. PCT/EP2004/014515.

* cited by examiner

WIRELESS DATA COMMUNICATION METHOD VIA ULTRA-WIDE BAND ENCODED DATA SIGNALS, AND RECEIVER DEVICE FOR IMPLEMENTING THE SAME

This is a National Phase Application in the United States of International Patent Application No. PCT/EP2004/014515 filed Dec. 21, 2004 which claims priority on European Patent Application No. 04000261.0, filed Jan. 8, 2004. The entire disclosures of the above patent applications are hereby incorporated by reference.

FIELD OF THE INVENTION

The present invention concerns a method for the wireless communication of data between a transmitter device and a receiver device. The transmitter device transmits ultra-wide band coded data signals via a first wide band antenna, and the receiver device receives direct and/or multiple path coded data signals via a second wide band antenna from the transmitter device. The transmitted data is defined by one or several successive sequences of N pulses where N is an integer number greater than 1. The arrangement of the N pulses of each sequence represents data coding relating to the transmitter device, i.e. identifying the transmitter device.

The invention also concerns the receiver device for implementing the method.

BACKGROUND OF THE INVENTION

In the present description, "data" means textual information, which includes one or several symbols or characters, audiovisual information, synchronisation information, positioning information or other information. The data transmitted in the data signals is defined by one or several very short pulse sequences whose coding can be defined by the time difference between each pulse.

Ultra-wide band data transmission technology is achieved using data signals that include a series of very short pulses without using a carrier frequency. The width of these pulses can be less than 1 ns. Since the data signal pulses are very short in the time domain, when converting into the frequency domain, this leads to an ultra-wide band spectrum, which defines UWB technology. The frequency spectrum can range from 500 MHz to several GHz. The frequency bandwidth is generally greater than 25% of the central frequency for ultra-wide band technology.

Data transmission via ultra-wide band technology applies normally to a short distance with low transmitted pulse power. This is generally due to the fact that the frequency spectrum is shared with narrow band transmission devices. This means that a single pulse is generally received with a lower power level than the noise level. Thus, it is often necessary to combine the energy from more than one pulse to transmit a single symbol or character in order for it to be recognised by the receiver device.

For the transmission of coded data signals, which includes one or more successive sequences of N very short pulses, the pulses can be of different shapes provided that their width is generally less than 1 ns. They may be, for example, Gaussian shape pulses with one or two polarities or alternations.

Since several ultra-wide band (UWB) transmitter and receiver devices can be located in spatial proximity while transmitting data signals, as a rule, the transmitted data signal sequence coding is unique for the transmitter device. In this way, the receiver device can recognise the coded signals from a particular transmitter device. Furthermore, all of the codes used for coding data are, as a rule, orthogonal, which means that when they are mutually correlated, the correlation results in a value close to 0.

Usually, the data transmitted in pulse sequence signals can be coded for example by pulse position modulation (PPM). The time difference between two consecutive pulses and the instant when the first pulse of each sequence appears can thus define the desired coding for the data communication. In order to do this, the pulses of each sequence are transmitted at a pulse repetition frequency (PRF), which can be greater than for example 10 MHz. Each of the pulses is thus transmitted in a repetition window of a determined length, which can be for example 20 ns or more. As a function of the desired time coding, the pulse may be in advance or in retard compared to a determined theoretical transmission position so as to be able to code for example a "0" or a "1".

When a pulse sequence coded signal transmission is carried out as above-mentioned, it is necessary that the pulses can be detected as a function of their position determined by the PPM during the signal reception in the receiver device. This generally requires a high time coherence in transmitter and receiver devices for the detection of transmitted data.

The coded data signals, which are transmitted by the transmitter device, can be reflected or refracted by various obstacles before being captured by the receiver device. Consequently, several time shifted coded signals, i.e. direct and/or multiple path signals, which include identical data, can be captured by the receiver device.

Several techniques for demodulating the information contained in coded data signals received by a conventional receiver device have already been proposed in the past. One of these known techniques consists in correlating coded data signals captured and shaped in the receiver device with an early replica and a late replica of the reference signal. The correlated early and late signals are then integrated, and a code adjustment is made for each replica in a code control loop until the level of the integrated early and late signals is identical. However, if all of the multiple path signals have to be detected, several correlation stages are used in parallel. Consequently, the electric power consumption of the receiver device is large, and many electronic components are necessary for processing signals in the receiver device, which constitutes a major drawback.

US Patent Application No. 2003/0095609 discloses a UWB method and apparatus for receiving several time spaced signals. The ultra-wide band signals are received by an antenna of the apparatus in order to be correlated in a correlator with a replica generated via a precision time generator. In order to obtain a replica like the coding of the signals captured by the antenna, the generator is clocked by a clock signal of a time base, and receives a code control signal from a code source. At the correlator output, the intermediate signals undergo temporal integration prior to demodulation and summation of the pulses in order to retrieve the information from the received ultra-wide band signals.

One drawback of this apparatus is that a correlation operation has to be carried out prior to demodulating and adding the pulses of the intermediate signals to retrieve the information. Moreover, the shape of the pulses must be known, and only the direct path signals or one of the multiple path signals can be detected with this apparatus, which is a drawback.

U.S. Pat. No. 6,483,461 discloses an ultra-wide band signal reception apparatus, which includes the same elements as the apparatus in US Patent Application No. 2003/0095609 so as to be used for positioning purposes. Consequently, the same drawbacks are noted as with the reception apparatus of the preceding Patent Application.

US Patent Application No. 2003/0058963 discloses a method and a device for receiving ultra-wide band type pulse signals. The signals include a heading frame for synchronisation retrieval in the reception device. In order to do this, the ultra-wide band signals are received by an antenna of the device and first of all compared to a threshold voltage in a comparator. At the output of the comparator, intermediate signals represent the sign of the received signal with respect to a threshold voltage. These intermediate signals are then sampled in sampling means, and sliding correlation is performed on a final set of samples using a reference replica to remove noise. This set of sample results of an addition of several groups of sampled signal samples. Each group of samples represents one of the pulses of the ultra-wide band signals. The temporal width of each group is equal to or greater than the reverse of a pulse repetition frequency of the ultra-wide band signals.

One drawback of such a device is that the information relative to the sign of pulses of ultra-wide band signals has to be exclusively used. Furthermore, the synchronisation verification has to be carried out by using information after the correlation operation. A pulse energy maximisation in the set of sample from the addition directly is not carried out, which is another drawback.

US Patent Application No. 2003/0198308 discloses a UWB time reference delay-hopped TR/DH communication system. The system reception device includes several pulse pair correlators operating in parallel to perform auto-correlation of the signals received by an antenna, and an analogue-digital converter at the output of each correlator. The information is subsequently demodulated using a known CDMA technique.

One drawback of this device is that it is necessary to carry out correlation operations as soon as the UWB signals are received, which complicates the realisation of this device in the same way as for US Patent Application No. 2003/0095609. Further, the communication system is limited to double pulse signals.

US Patent Application No. 2003/0002347 discloses an ultra-wide band signal reception apparatus, which includes the same elements as the apparatus of US Patent Application No. 2003/0198308 so as to be used for positioning purposes. Consequently, the same drawbacks are observed as with the reception apparatus of the preceding Patent Application.

It is thus a main object of the invention to overcome the drawbacks of the prior art by providing a wireless data communication method via ultra-wide band coded data signals that is able to process simply all of the direct path and/or multiple path coded signals captured by the receiver device.

It is another object of the invention to provide a wireless data communication method via coded ultra-wide band data signals for maximising the amplitude of the data pulses in relation to the noise captured by the receiver device.

SUMMARY OF THE INVENTION

The invention therefore concerns an aforecited method that is characterized in that the N pulses of a pulse sequence of direct path and/or multiple path coded data signals received by the receiver device are each processed in one of N corresponding reception time windows, each of the N reception time windows being positioned in time as a function of a known theoretical arrangement of the N pulses of the signals transmitted by the transmitter device, and in that an operation of adding the N windows is performed in the receiver device such that the added pulse amplitude level is higher than noise amplitude level captured by the receiver device.

One advantage of the communication method according to the invention is that most of the pulses of the direct path and/or multiple path signals received from each time window can be added coherently, since each of the N reception time windows is positioned in time in accordance with a known placing of the N coded data signal pulses transmitted by the transmitter device. Even if the direct path signals cannot be captured by the receiver device because of an obstacle on the signal path, it is possible to add coherently the pulses of each corresponding window from the multiple path coded signals. This coherent addition of N windows does not occur in conventional communication systems such as those disclosed in US Patent Applications Nos. 2003/0095609 and 2003/0198308.

Each window can be chosen with sufficient width to capture each of the N pulses of all of the signals received by the receiver device. This width, which is the same for all the time windows, can be adjusted as a function of the propagation features of the transmission channel, and during the time and frequency synchronisation phase for received signal data acquisition. The width of each window may be for example 20 or 50 ns, and each window is, as a rule, centred on a theoretic reference position relative to the direct path signal pulses.

The position of the start of each window corresponds to the position of the coded data signal sequence pulses for carrying out coherent addition of the pulses of each window. With this coherent addition of the time window pulses, the added pulse amplitude level becomes higher than the noise level if the receiver device is properly synchronised in time and frequency in relation to the transmitter device. After this time window addition step, data demodulation can be carried out in a signal processing unit of the receiver device.

The window addition can be achieved analogically prior to analogue-digital conversion of the data signals, or digitally after analogue-digital conversion. In order to reduce the electric power consumption of the receiver device, signal sampling can only be carried out in an analogue-digital conversion stage during time intervals that are identical to the duration of the time windows.

Because of the time window addition, the noise signal amplitude level received by the receiver device is greatly reduced, in relation to the added pulse level. This is due to the fact that the voltage polarity of the noise signals in the time interval of each window is not precisely defined, unlike the voltage polarity of the data signal pulses.

Preferably, the data is coded by time modulation of the pulses of each sequence as indicated hereinbefore. However, one could also consider coding the data by pulse polarity or phase modulation or by a combination of pulse time and polarity or phase modulation. In the case of pulse polarity modulation, each window, which includes one or several pulses, is multiplied by −1 for pulses of negative polarity and by +1 for pulses of positive polarity so as to be able subsequently to add the pulses of all the windows in a coherent manner.

Another advantage of the communication method according to the invention is that the clock or sampling signals of the receiver device can be frequency adjusted owing to the result of the time window addition. The clock or sampling signal frequency is adjusted to the clock signal frequency of the transmitter device by a signal processing unit of the receiver device. This frequency adjustment can be made at any time when, for example, an alteration to the position of the added pulses in a final time window is observed, or when the added pulse amplitude level decreases.

In order to carry out this adjustment, the data signals transmitted by the transmitter device can include a synchronisation frame. This synchronisation frame includes several successive sequences of N pulses identifying the transmitter device. Thus, since the receiver device knows the position of the pulses of each of the sequences, it can carry out a two dimensional time and frequency search to find the start of transmission and the frequency deviation.

Owing to the communication method according to the invention, it is possible to choose and track the sampling or clock signal frequency in order to maximise the added pulse amplitude peak whether the pulses are direct or multiple path signal pulses.

Another advantage of the communication method according to the invention is that it can be used for positioning purposes. In order to do this, at least two transmitter devices, or even three transmitter devices are generally required to transmit coded data signals. This enables the receiver device to calculate the positioning coordinates as a function of the first coded signal time of arrival as described hereinafter. For a positioning operation, the number N of pulses per transmitted data sequence can be for example equal to 1024 with a pulse width of for example 0.5 ns.

Another advantage of the communication method according to the invention is that the noise level captured can be estimated in the signal processing unit of the receiver device. In order to do this, several maximum signal absolute value amplitudes are calculated successively or in parallel in one or several time sub-windows in the signal processing unit of the receiver device. These sub-windows are shifted by specified time intervals from the start of the time window at the end of the said time window. An estimation of the noise amplitude level is carried out by selecting the minimum amplitude value from all the calculated amplitude values. This estimation can be carried out before or after the time window addition operation.

Another advantage of the communication method according to the invention is that it allows the time of arrival of the first direct path and/or multiple path coded data signals to be calculated. In the case where the direct path signals are not captured by the receiver device, the first multiple path signals are processed. This time of arrival estimation operation consists first of all in calculating a positive signal envelope for each time window or the final time window. Afterwards, minimum and maximum points of the envelope are determined and a central point is calculated, where the slope of the rising edge of the envelope is estimated using a linear or affine function.

The invention also concerns a receiver device for implementing the wireless data communication method wherein all of the direct path and/or multiple path coded signal pulses captured can be processed simply.

Therefore, the receiver device for implementing the communication method, which includes a second oscillator stage delivering at least a second clock signal at a second defined frequency, a second signal processing unit connected to the second oscillator stage, and an analogue-digital conversion stage for the coded data signals received by the second wide band antenna, is characterized in that the signal processing unit includes time window adding means for coherently adding the pulses of each of the N time windows.

BRIEF DESCRIPTION OF THE DRAWINGS

The objects, advantages and features of the wireless data communication method via ultra-wide band signals, and of the receiver device for the implementation thereof will appear more clearly in the following description of embodiments of the invention with reference to the annexed drawings, in which.

DETAILED DESCRIPTION OF THE ILLUSTRATIVE EMBODIMENTS

In the following description, those elements of the wireless data communication system via ultra-wide band coded data signals used for implementing the communication method, which are well known to those skilled in the art, will not be explained in detail.

Figure 1A:
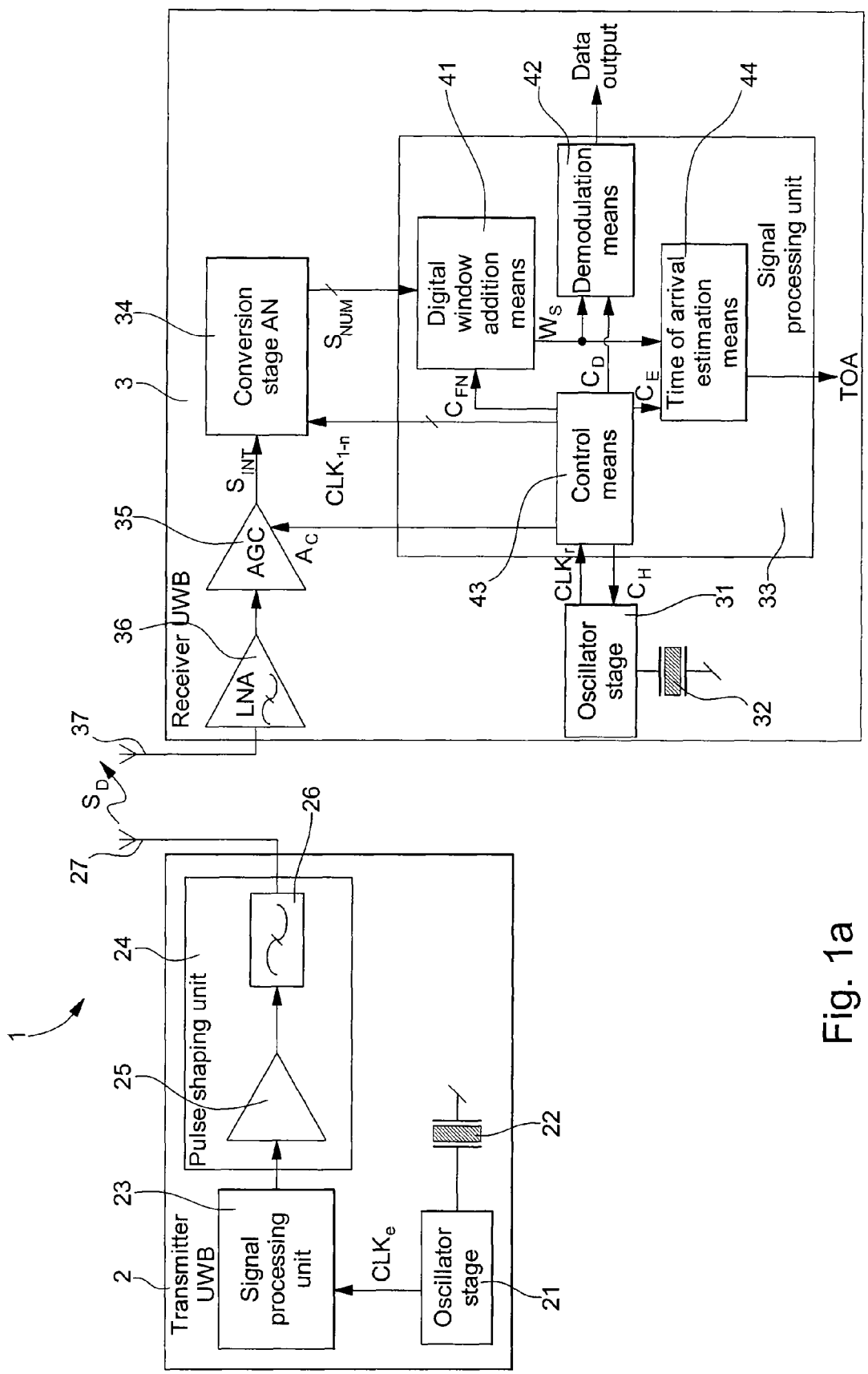
FIG. 1a shows schematically a data communication system for implementing the communication method according to the invention, wherein the time windows are added digitally in a receiver device.
Figure 1B:
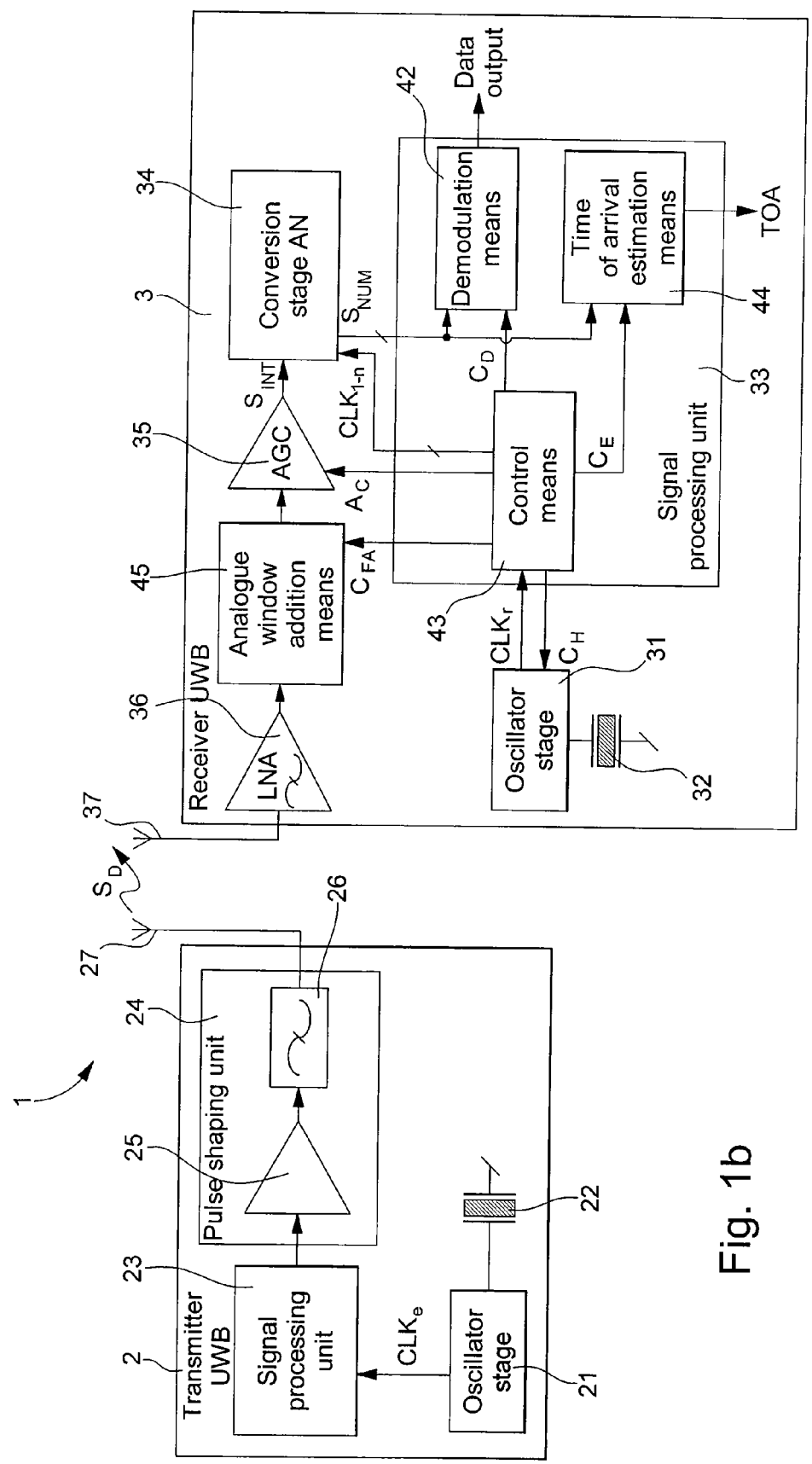
FIG. 1b shows schematically a data communication system for implementing the communication method according to the invention, wherein the time windows are added analogically in a receiver device.

FIGS. 1a and 1b shows schematically a communication system 1 for implementing the wireless data communication method via ultra-wide band coded data signals $S_D$. Communication system 1 includes at least one transmitter device 2, which transmits coded data signals $S_D$ via a first wide band antenna 27 and a receiver device 3, which receives direct path and/or multiple path coded data signals via a second wide band antenna 37.

As explained hereinafter, particularly with reference to FIG. 2, the direct path and/or multiple path pulses received by receiver device 3 and corresponding to transmission of one of the N coded data signal pulses are processed or selected in one of the N corresponding time windows in receiver device 3. Since each time window is positioned chronologically as a function of the known position of each pulse of the transmitted coded data signals $S_D$, an addition of the time windows is performed in order to add coherently the pulses of each window.

Generally, transmitter device 2 includes a stage oscillator 21 for providing a clock signal $CLK_e$, whose frequency depends upon a quartz resonator 22, a signal processing unit 23 clocked by the clock signal, and a pulse shaping unit 24 connected to signal processing unit 23. Given the use of a stage oscillator 21 with a quartz 22, the frequency of clock signals $CLK_e$ can preferably be multiplied M times in signal processing unit 23. This multiplication by M of the frequency of clock signals $CLK_e$ is obtained conventionally using delay gates that are not shown, and a combination of the clocking pulses at the output of the delay gates.

In signal processing unit 23, the useful frequency for generating data pulses may be greater than or equal to 1 GHz. This requires the use of at least 4 delay gates shifted by a quarter period in relation to a period of clock signal $CLK_e$ at a frequency of the order of 250 MHz.

For UWB coded data signal transmission, processing unit 23 of transmitter device 2 has to provide, to pulse shaping unit 24, one or several sequences of N successive pulses of positive or negative voltage or current polarity. Each pulse of the sequences is generated in a time interval corresponding to the reverse of a pulse repetition frequency. For UWB data signals, this pulse repetition frequency (PRF) can be higher than or equal to 10 MHz.

The way in which the data is coded in sequences of N pulses in signal processing unit 23 of transmitter device 2 must, on the one hand, differentiate each symbol or character to be transmitted and, on the other hand, identify the transmitter device. A close receiver device 3 can thus recognise where the received data signals have come from, since the various codes used for the transmitter devices identification are orthogonal.

Pulse shaping unit 24 receives the data in the form of one or more sequences of N pulses to be transmitted by the first UWB antenna 27 of signal processing unit 23. These coded data pulses in processing unit 23 are amplified in an amplifier 25 of pulse shaping unit 24, and filtered in a conventional bandpass filter 26 prior to being transmitted by first UWB antenna 27. Generally, the shape of the energy pulses of data signals $S_D$ transmitted by first UWB antenna 27 is obtained by derivation of the shaped pulses, due to a current variation at the antenna $_{[RM2]}$. The transmitted pulses may be Gaussian shaped with one or two alternations, or of another shape.

FIGS. 3a to 3d show the way in which the data is coded, such as one or more characters or symbols is represented by one or more sequences of N pulses in the data signals.

Figure 3A:
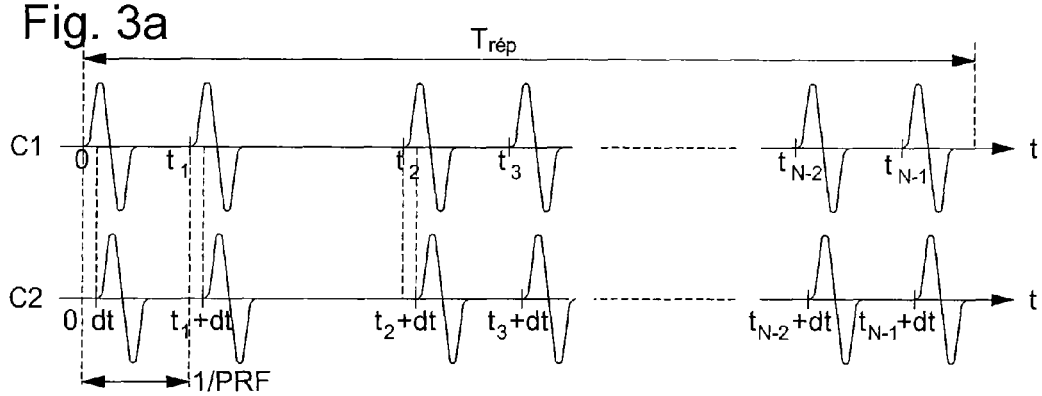
FIGS. 3a to 3d show graphs showing a temporal data coding modulation, polarity data coding modulation, a temporal and polarity data coding modulation, and an amplitude coding modulation of the transmitted data of the communication method according to the invention.

The data can be coded by temporal modulation of the pulses of each sequence, as shown in FIG. 3a. This is called Pulse Position Modulation (PPM). The pulses presented are Gaussian shaped with two alternations. Of course, the pulse shape can also be Gaussian with one positive or negative alternation, or of various other shapes.

In FIG. 3a, each character C1 and C2 is defined by N pulses, each pulse of which is of smaller length than 1 ns, in a sequence repetition period $T_{rep}$. Each pulse is generated by temporal interval 1/PRF corresponding to the reverse of the pulse repetition frequency PRF as described hereinbefore. The temporal position of each pulse in the temporal interval is specific to the character to be coded. Moreover, the delay between each pulse of the sequence of N pulses is preferably pseudo-random to identify the transmitter device. With this arrangement of N pulses per sequence repetition period $T_{rep}$, the character or symbol C2 differs from character or symbol C1 only by a temporal difference dt of each of the N pulses generated. Of course, for other characters or symbols to be transmitted, the temporal difference dt is different each time.

The sequence repetition time $T_{rep}$ can be for example 0.1 ms with 1024 pulses per sequence, or 10 µs with 256 pulses per sequence.

Figure 3B:
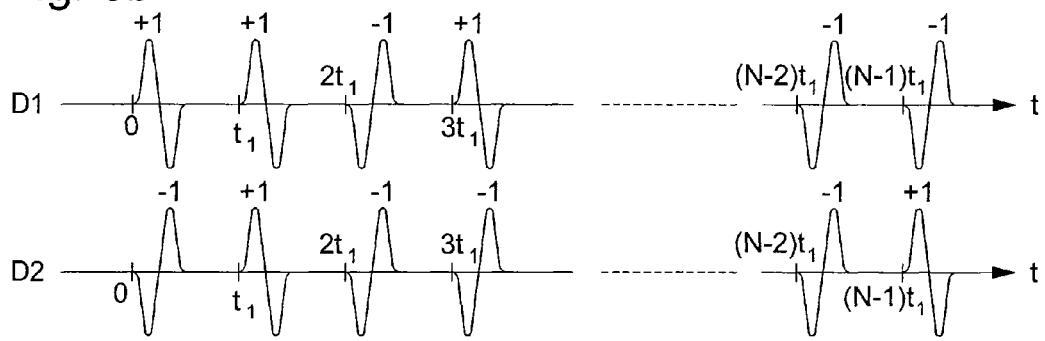

The data can also be coded by polarity or phase modulation of the pulses generated by the signal processing unit of the transmitter device as shown in FIG. 3b.

In this FIG. 3b, it will be noted that the identical temporal difference between each pulse is equal to a period repetition value 1/PRF. Conversely, the pulse polarity, particularly, the phase, is a coding feature that identifies the transmitter device, as is the character or symbol D1 or D2 to be transmitted in the data signals.

The positive polarity or zero phase of double alternation pulses can define a +1 state, whereas negative polarity or 180° phase of double alternation pulses can define a −1 state. Since the shape of the pulses shown in FIG. 3b is Gaussian with two alternations, the difference between a +1 state and a −1 state is observed via a 180° phase shift of the pulse. However, one could very well have imagined a Gaussian shape with positive alternation to define a +1 pulse state, or a negative alternation to define a −1 pulse state.

Figure 3C:
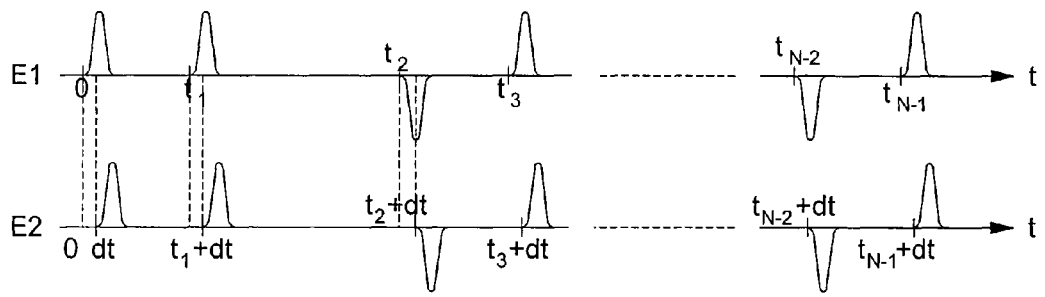

In FIG. 3c, the data is coded by a combination of temporal and polarity modulation of the pulses. The N pulses of a sequence for defining the character or symbol E1 or E2 are presented with a simple alternation. Each pulse can be of positive or negative polarity. However, the character or symbol E2 differs from character or symbol E1 via a temporal delay dt of each generated pulse. It should be noted that the polarity of each 1 alternation pulse of each character could also be different.

Figure 3D:
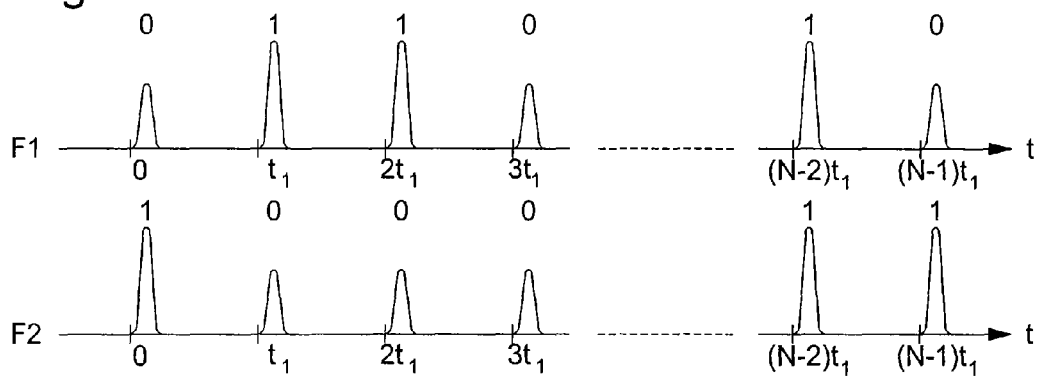

Finally, FIG. 3d shows data coding via amplitude modulation of the simple positive alternation pulses. The amplitude of a pulse below a determined amplitude threshold defines a 0, whereas the amplitude of a pulse above a determined threshold defines a 1. In the case of pulse amplitude modulation, the identical temporal delay between each pulse is equal to a pulse repetition frequency value 1/PRF. The character or symbol F1 differs from character or symbol F2 by a sequence of N pulses of different amplitude.

It should be noted that pulse amplitude modulation is not a robust method. Moreover, it is difficult to implement in UWB technology, which means that preferably, the data is coded in accordance with one of the modulation methods shown in FIGS. 3a to 3c, or a combination of these modulation methods.

For the reception of direct path and/or multiple path coded data signals $S_D$, receiver device 3 includes first of all a second wide band antenna 37. This antenna 37 provides signals, which are derived on the basis of the captured coded data signals, to a low noise amplifier (LNA) 36, equipped with a band pass filter. After this LNA 36, an automatic gain control amplifier (AGC) 35 can be used, whose amplification factor $A_C$ is controlled by control means 43 of a signal processing unit 33. Amplifier 35 provides the amplified intermediate signals $S_{INT}$ to an analogue-digital conversion stage 34 responsible for the digital conversion of the analogue signals.

Receiver device 3 further includes a stage oscillator 31 for supplying a clock signal $CLK_r$, whose frequency depends upon a quartz resonator 32, and a signal processing unit 33 clocked by clock signal $CLK_r$. Clock signals $CLK_r$ are provided in particular to the signal processing unit control means 33.

Given the use of a stage oscillator 31 with a quartz 32, control means 43 are responsible for multiplying the clock frequency $CLK_r$ by a factor n as for the transmitter device described hereinbefore. On the basis of the clock signals $CLK_r$, control means 43 provide in particular clocking signals $CLK_{1-n}$ to analogue-digital conversion stage 34 for sampling operations. This conversion stage 34 will be described hereinafter with reference to FIGS. 6a and 6b.

It should be noted that in order to reduce the electrical power consumption of the receiver device, one could envisage only sampling the intermediate signals during periods identical to the temporal width of each window.

According to a first embodiment of receiver device 3 of FIG. 1a, signal processing unit 33 includes in addition to control means 43, digital window addition means 41 for receiving sampled signals $S_{NUM}$ from the analogue-digital conversion stage 34, data demodulation means 42 and time of arrival estimation means 44. Means 42 and 44 are both connected to the output of digital window addition means 41 for receiving signals from a final addition window $W_S$.

In order to control the operations of signal processing means 33, control means 43 first of all provide control signal $C_{FN}$ to digital window addition means 41. These control signals $C_{FN}$ adjust the temporal placement of the time windows to select parts of the digital signals, i.e. the placing of the first of the N windows in time.

In order to arrange the time windows, a two dimensional time and frequency search must therefore be carried out. This search will provide proper synchronisation and a clock frequency of oscillator stage 31 proportionally adapted to the clock frequency of oscillator stage 21, which is the basis of the generation of the transmitted coded data signal pulses. Thus, control means 43 can directly adjust the frequency of clock signals $CLK_r$ by control signals $C_H$. These control signals $C_H$ can adapt a resistive or capacitive value of a network of well known resistors or capacitors of oscillator stage 31.

Another frequency search method consists in using control signals $C_{FN}$ to alter the pulse time or repetition frequency scale of the N windows to be added of the digital window addition means 41. This means performing a re-sampling operation in signal processing unit 33 of receiver device 3 with a different re-sampling frequency from the sampling frequency of analogue-digital conversion stage AN 34. The re-sampling frequency generated by control means 43 may be much higher so as to increase precision particularly for positioning.

Once the window addition operation has been performed in digital window addition means 41, the control means supply control signals $C_D$ to the data demodulation means 42. These data demodulation means are able to provide data only if the N pulses of a time window sequence have been coherently added.

In order to recognise the character(s) or symbol(s) transmitted in the coded data signals, signals $W_S$ of the final window must present one or several pulses to demodulation means 42 whose amplitude is higher than a determined threshold and the received noise level at the receiver device 3. In this way, it is possible to determine the character(s) or symbol(s) particularly by the position of the pulses in the final window for PPM type modulation.

It should be noted that the maximum amplitude pulse of the final window is not necessarily due to the N added pulses of the direct path signals, since it is possible for obstacles on the path of the coded data signals, to attenuate the amplitude of each direct path signal pulse or to prevent reception of such signals. However, since the N pulses of all the direct or multiple path coded data signals have each to be processed in one of the N width-adapted time windows, it is possible to provide final window signals $W_S$ to demodulation means 42 in which at least one maximum pulse results from multiple path signals.

In order to estimate the noise level and time of arrival of the pulses of the first direct or multiple path coded data signals, control means 43 provide control signals $C_E$ to time of arrival estimation means 44 so that time of arrival data TOA is provided. These time of arrival estimation means are explained hereinafter with reference to FIGS. 7 to 9.

According to a second embodiment of the receiver device presented in FIG. 1b, the essential difference in relation to the first embodiment of FIG. 1a is that the window addition occurs in analogue window addition means 45. These means 45 can be outside signal processing means 33 or incorporated therein. The analogue window addition means 45 can be inserted between amplifier 36 and amplifier 35. However, means 45 can also be placed after amplifier 35 and before analogue-digital conversion stage 34.

Conventionally, in order to add up all the time windows analogically, a number N−1 of delay gates are used, not shown, whose time period is adjusted to the position of each of the desired N windows. The coded data signals received by antenna 37 pass through each of these gates so as to be able to add up in proper synchronism, for a time period equivalent to the width of each window, the output signals of each delay gate and the input signals of the first of said gates. The signals resulting from this addition are then amplified by amplifier 35 and sampled by conversion stage 34.

Analogue-digital conversion stage 34 provides digital signals $S_{NUM}$ matching the sampling of signals from the final addition window of analogue window addition means 45. These digital signals $S_{NUM}$ are directly processed by demodulation means 42 and time of arrival estimation means 44.

Figure 2:
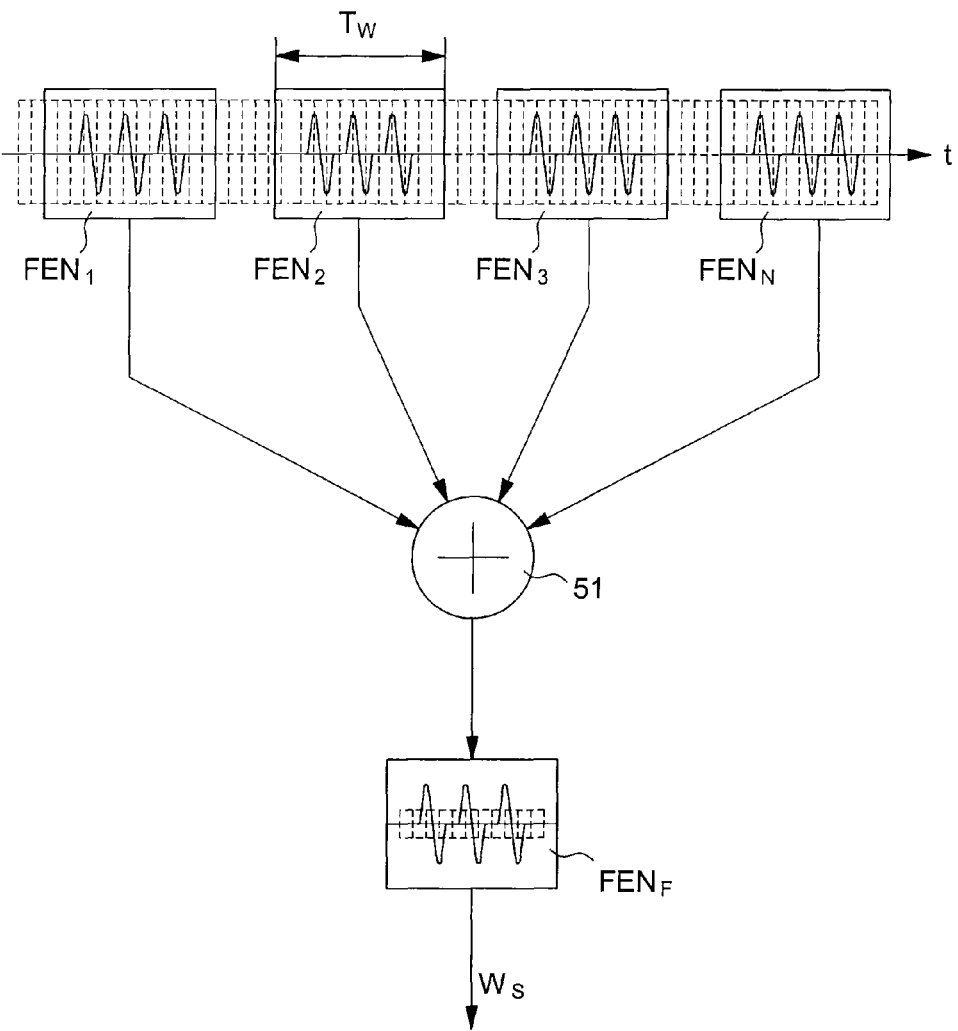
FIG. 2 shows schematically how the signals of the N time windows are added in a receiver device for the communication method according to the invention.

FIG. 2 shows the time window addition operation, which is a main feature of the data communication method whether the addition is of analogue or digital signals.

The coded data signals, which are captured by the second antenna of the receiver device, include noise in addition to the pulses of each sequence defining the data to be demodulated. This noise is represented in FIG. 2 by dotted lines to distinguish it from the coded data signal pulses. It can be seen that in each window $FEN_1$ to $FEN_N$, direct and multiple path signal pulses are captured by the receiver device, but with a lower amplitude level than the noise level.

The N windows, which contain the pulses of all the captured coded data signals, originating from a specific transmitter device, are arranged in accordance with a time arrangement determined as a function of the known theoretical position of each direct path coded data signal pulse. The width of each window $T_W$ is adapted so as to be able to detect the pulses of several direct and multiple path coded data signals bearing the same data, which is one advantage of the present invention.

Each time window can have a width comprised between 20 and 50 ns for example, and starts before the appearance of each pulse of the direct path signals. However, this width may be smaller while capturing at least one of the multiple path signals in addition to the direct path signals, or also larger for example of the order of 100 ns in the case of positioning.

In a positioning or text or synchronisation data communication system, it is generally advantageous for the width of the time windows to be larger during the temporal synchronisation search. This enables direct and/or multiple path signals to be detected which may be partially received with a lot of advance or delay on the theoretic expected position.

When temporal synchronisation is found and the clock signal frequency of the transmitter and receiver devices has been properly adjusted, each pulse of a data sequence is properly located in each time window. Consequently, when all of the time windows $FEN_1$ to $FEN_N$ are added up by at least one adder 51, all of the pulses of sequences of all the signals captured by the receiver device are added up coherently to maximise the pulse amplitude level in relation to the noise level. Since the noise signal voltage polarity is not precisely defined in the time interval of each window, unlike the voltage polarity of the data signal pulses, after the addition operation the noise amplitude level is lower than the pulse amplitude level.

Figure 4:
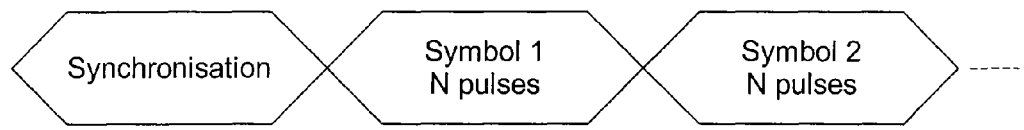
FIG. 4 shows in a simplified manner the coded data signals starting with a synchronisation frame for the communication method according to the invention.

In order to obtain coherent addition of the pulses of each window, there must be proper synchronisation between the transmitter device and the receiver device. In order to do this before transmitting various characters or symbols in the data signals, one may wish to transmit a synchronisation frame at the start as shown symbolically in FIG. 4. This synchronisation frame is composed of one or several successive sequences of N pulses. This leaves time for the receiver device to adjust the placing of the windows as a function of the position of each pulse of the sequences. Moreover, this leaves time for synchronising the frequency of the second oscillator stage 31 with first oscillator stage 21, or synchronising the re-sampling frequency of digital window addition means 41.

Figure 5:
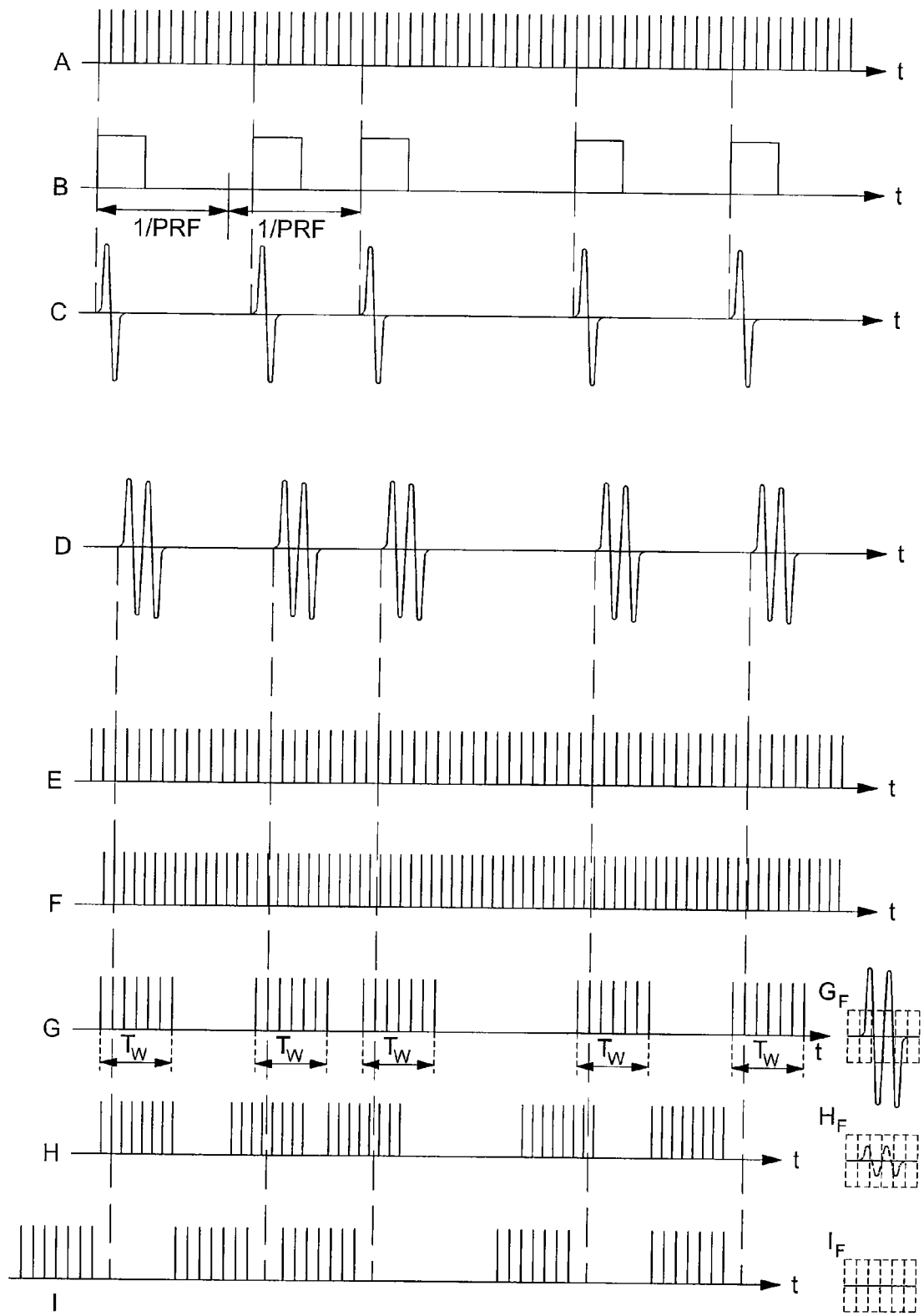
FIG. 5 shows a graph of the signal in the transmitter device and in the receiver device in the case of time and frequency synchronisation of the clock signals of the two devices, in the case of a frequency deviation between the clock signals and in the case of non temporal synchronisation of the windows of the communication method according to the invention.

In order to understand the importance of having proper synchronisation between the transmitter device and the receiver device so as to be able to demodulate the received coded signal data, reference can be made to various signals shown in FIG. 5. Signals A to C are transmitter device signals, whereas signals D to I are receiver device signals. In this FIG. 5, the number N of pulses is chosen to be equal to 5, which matches a processing gain PG of the order of 7 dB after the time window addition operation in the receiver device.

This processing gain can be calculated using the formula $PG = 10 \cdot \log N$ [dB], which means that if a larger gain is desired, each sequence, which defines one or several characters, must include a large number N of pulses. Of course, with a larger number of pulses per sequence, it is inevitable that data demodulation will slow down, but this may be tolerated depending upon the type of data to be transmitted. For example, with a number N equal to 200, the processing gain will be of the order of 23 dB, and with a number N equal to 1024, the processing gain will be of the order of 30 dB.

Signals A are reference clock signals with a frequency $f_0$, which are used for clocking data modulation in the processing unit of the transmitter device.

Signals B are signals leaving the processing unit of the transmitter device, which include one rectangular pulse per pulse repetition period 1/PRF. These signals B are trigger signals for the pulse shaping unit of the transmitter device.

Signals C are coded data signals transmitted by the wide band antenna of the transmitter device. The data in these coded signals are defined by double alternation pulses of smaller width than 1 ns.

Signals D are signals captured by the wide band antenna of the receiver device. It will be noted that these signals can contain direct path and/or multiple path pulses, which can have a different shape from the pulses transmitted after the wide band antenna of the receiver device. In practice, a derivative can be observed in the coded signal pulses.

Signals E are clocking signals for sampling the analogue signals in the analogue-digital conversion stage of the receiver device. The sampling frequency $f_s$ of signals E is identical to the frequency $f_s$ of the reference clock signals of the transmitter device.

Signals F are clocking signals for sampling the analogue signals in the analogue-digital conversion stage of the receiver device, whose sampling frequency $f_s$ has a frequency offset df relative to frequency $f_0$. This frequency has to be adjusted in the receiver device during the two dimensional time and frequency synchronisation phase.

Signals G are time windows of samples of selected parts of the data signals where the time between each start of a window exactly matches the time between each pulse of the data sequence. The sampling frequency $f_s$ is adjusted to the frequency $f_0$ of the reference clock signals as shown by signals E. When the pulses of each of these windows of width $T_W$ are coherently added up in the receiver device, it will be noted that the pulse amplitude level becomes higher than the noise level in final window $G_F$.

It should be noted that each time window receiving a part of the coded data signals can be obtained, in the data processing unit of the receiver device, by a multiplication by 1 of the coded signal parts to be selected, and by 0 of the parts to be removed.

Signals H are time windows of samples of selected data signal parts where a clock frequency offset is observed between the transmitter device and the receiver device by using sampling signals, like signals F. In this case, addition of the pulses of each window does not provide an added pulse amplitude level that is higher than the noise level in final window $H_F$.

Signals I are time windows of samples of selected data signal parts where the time between each start of a window exactly matches the time between each pulse of the data sequence, but without temporal synchronisation between the transmitter device and the receiver device. The sampling frequency $f_s$ is however well adjusted to the reference clock frequency $f_0$ as shown by signals E. However, the start of the N windows is shifted time-wise, which means that no sequence pulse is captured by the receiver device and gives a window addition without any pulses as shown in the final window $I_F$.

Since the receiver device knows the arrangement of the pulse sequences to be captured, a first step consists in finding the start of each pulse sequence, either by time shifting in a serial manner or by searching in parallel at several different times. If the sampling frequency is not sufficiently close to the reference clock signal frequency of the transmitter device, this search can be repeated either in series, or in parallel with different sampling frequencies.

Once temporal synchronisation has been found, the sampling or re-sampling frequency can be adapted to the reference clock signal frequency of the transmitter device by controlling the pulse amplitude level in the final window until this amplitude level is maximised relative to the noise level.

At any time, the sampling or re-sampling frequency can be adapted by controlling any decrease in the pulse amplitude level in the final time window or by progressively moving pulses in said final window. The movement of added pulses in the final time window can be due to the Doppler effect if the transmitter device moves away from or towards the receiver device.

If the time window addition is performed analogically, as described hereinbefore and illustrated in FIG. 1b, the sampling frequency will be frequency $CLK_r$, which controls the analogue window addition.

Figure 6A:
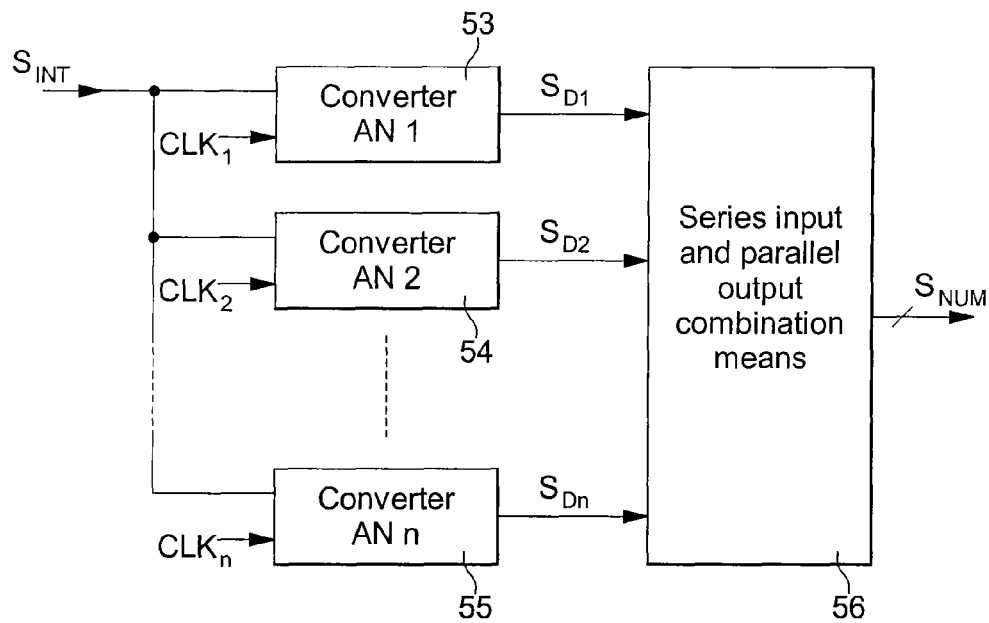
FIGS. 6a and 6b show one embodiment of an analogue-digital conversion stage of the receiver device, and clocking signals of the conversion stage for implementing the communication method according to the invention.
Figure 6B:
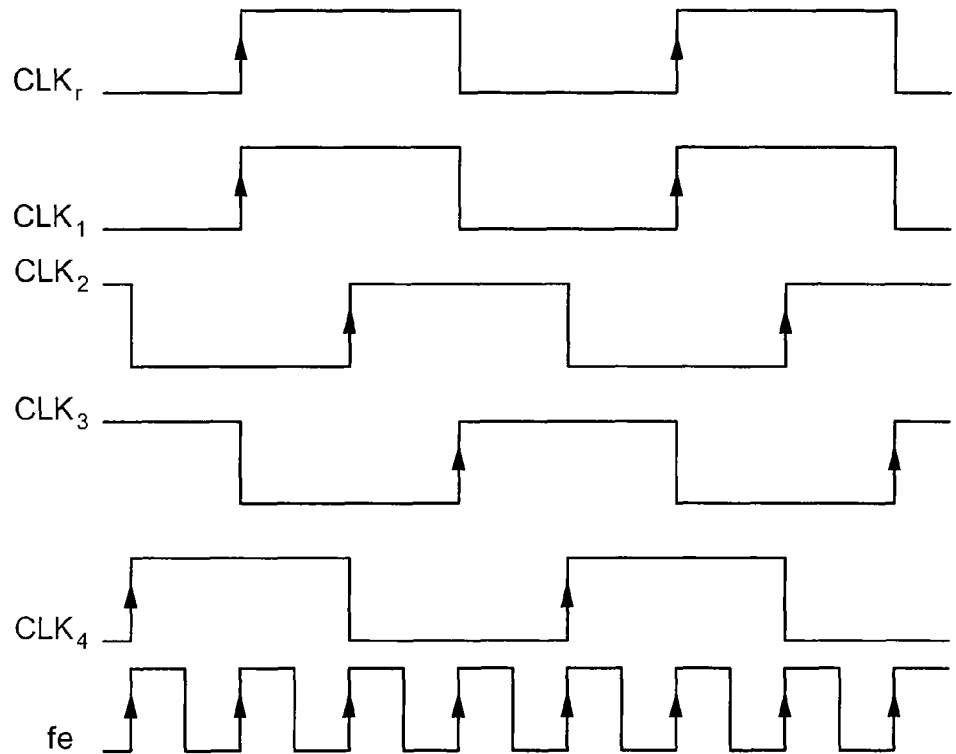

FIGS. 6a and 6b show an embodiment of the analogue-digital conversion stage of the receiver device, and the clocking signals of the stage converters.

The analogue-digital conversion stage includes a number n of converters AN 53 to 55 working in parallel. Each converter 53 to 55 is clocked by a clocking signal $CLK_1$, $CLK_2$ to $CLK_n$ with an identical frequency to that of clock signals $CLK_r$ generated by the oscillator stage. Each clocking signal $CLK_1$, $CLK_2$ to $CLK_n$ is phase shifted by 360°/n for each converter 53 to 55. Consequently, the n phase shifted clocking signals allow sampling of intermediate analogue signals $S_{INT}$ at an effective frequency $f_e$ of n times the frequency of clock signals $CLK_r$.

Since the intermediate signal sampling is generally carried out at a frequency of 2 times the bandwidth of the coded data signals, for example at a frequency that may be equal to or higher than 2 GHz, one could envisage having 4 converters clocked by 4 clocking signals phase shifted in relation to each other by 90° as illustrated in FIG. 6b. The frequency of clock signals $CLK_r$ must thus be 4 times less than the effective sampling frequency $f_e$.

At each rising edge of the clocking signal, each converter 53 to 55 provides an m bit signal $S_{D1}$ to $S_{Dn}$, where m can have a value from 1 to 8. These binary signals $S_{D1}$ to $S_{Dn}$ are provided to serial input and parallel output type combination means 56, which are responsible for combining all of the signals received from the converters in order to provide digital signals $S_{NUM}$ for the signal processing unit of the receiver device.

Figure 7:
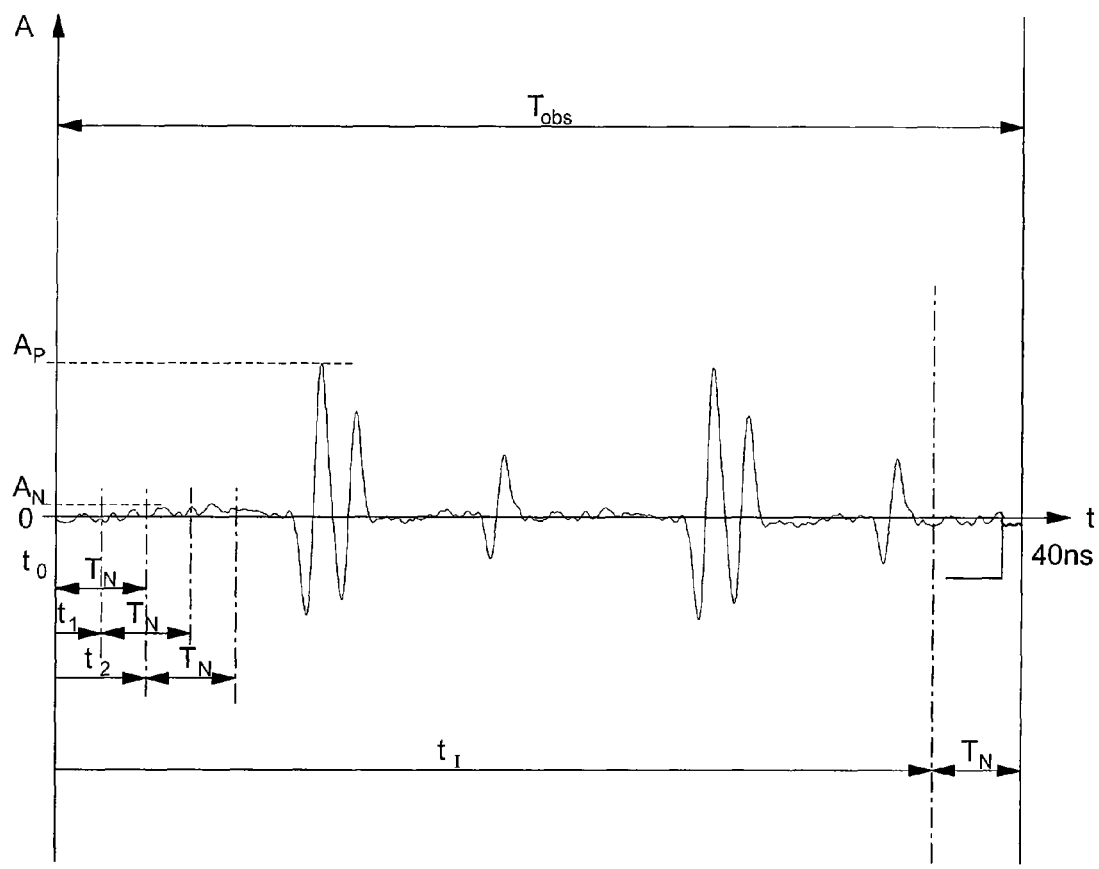
FIG. 7 shows a graph of the signal of one time window of the receiver device of the steps for estimating the noise level captured by a device using the communication method according to the invention.
Figure 8:
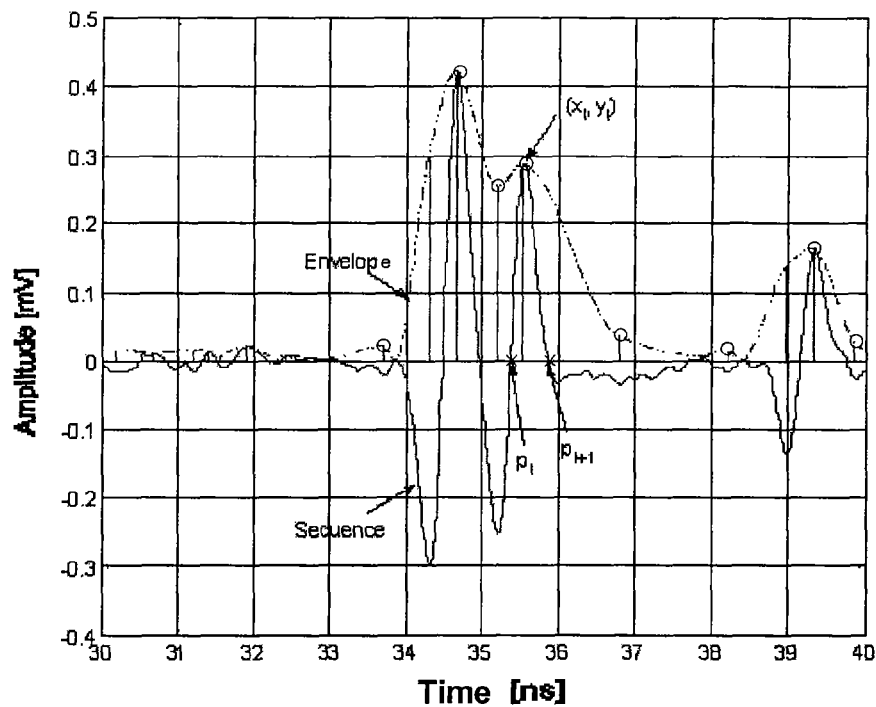
FIG. 8 shows a graph of one part of a time window of the receiver device and the steps for calculating the positive signal envelope of the time window of the communication method according to the invention.
Figure 9:
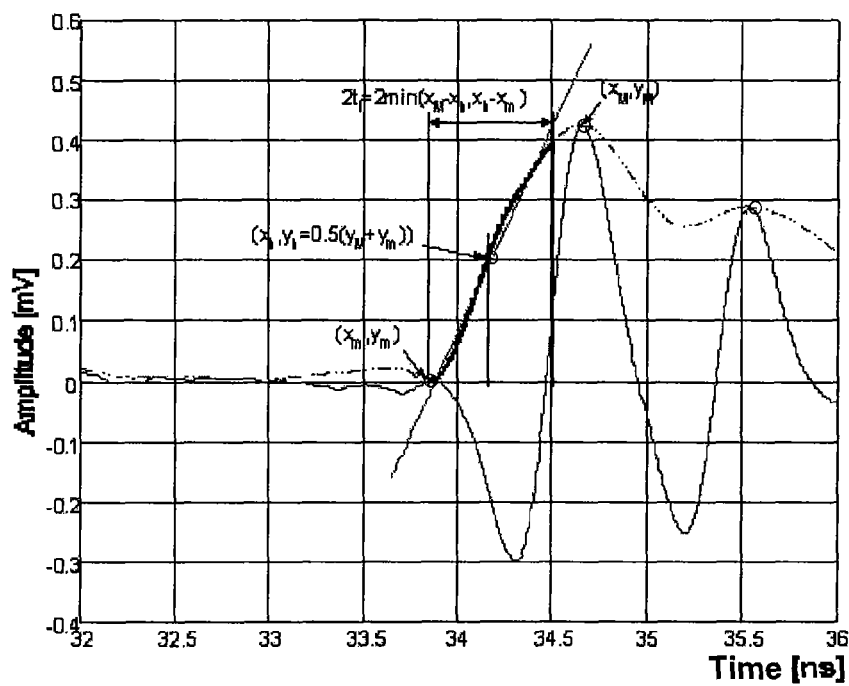
FIG. 9 shows a graph of one part of a time window of the receiver device and the steps for calculating the time of arrival of the first direct path or multiple path coded data signals of the communication method according to the invention.

FIGS. 7 to 9 show graphs of signals of a time window for estimating noise level, calculating the signal envelope of a window and the time of arrival of the data signals. These operations are carried out in the time of arrival estimation means 44 of signal processing means 33, shown in FIGS. 1a and 1b, under the control of control signals $C_E$ generated by control means 43.

First of all, FIG. 7 shows a method of estimating noise level $A_N$ using a graph of the signals of one time window. This method is based on the fact that inside the time window observation interval, there is at least one time window portion of length $T_N$ during which there is no energy belonging to the transmitted data sequence pulses. The estimated noise level $A_N$ is lower than the maximum amplitude level $A_P$ of the coherently added pulses.

In order to estimate noise level $A_N$, several absolute value maximum amplitude values $A_i$ are calculated for signals $s_i(t)$, with i ranging from 0 to I, in time sub-windows of length $T_N$. The I+1 time sub-windows for calculating the amplitude values are time shifted in relation to each other by a determined time interval from the start of the observation time window to the end of said time window. For I+1 time windows to be calculated, the number of time intervals is I.

The absolute value noise amplitude level value $A_N$ is equal to the minimum amplitude value among the $A_i$ calculated values, or to the minimum value of the maximum of all the signals $s_i(t)$.

FIG. 8 shows a method of calculating the positive envelope of the digitised time window signals over a part of said time window.

According to this method, firstly, all of the zero crossing positions $p_i$ of the time window signals are determined, i.e. all the positions where sampling before and after p, has an opposite sign. After this step, the coordinates $(x_i, y_i)$ of the absolute value amplitude maximum are determined in each interval from $p_i$ to $p_{i+1}$, with i ranging from 1 to I−1. Afterwards, the envelope is calculated using an interpolation algorithm, which may be for example the piecewise cubic Hermite interpolation algorithm.

Finally, with reference to FIG. 9, there is shown a method of estimating the time of arrival of the first data signals received by the receiver device. These first signals may be direct path signals or multiple path signals in the absence of any direct path.

For this estimation, an amplitude threshold th is first calculated based on the envelope amplitude peak $A_P$ and on the noise amplitude level estimation $A_N$ described with reference to FIG. 7. This threshold th may be calculated by the following formula: $th = 5 \cdot A_N + A_P/25$.

Next, the rising edge of the envelope where the threshold th is exceeded for the first time is estimated by selecting a segment of the envelope shown in bold in FIG. 9. An approximation of this segment with a given function is carried out so that it can be used to estimate the rising edge of the envelope. In order to do this, first the maximum local point of the envelope is estimated at the coordinates $(x_M, y_M)$, which directly follows the point where the envelope passes above threshold th. The minimum local point of the envelope is also estimated at the coordinates $(x_m, y_m)$ that precede the point where the envelope passes above threshold th.

After establishing these coordinates, the value $y_h$, which is equal to $0.5 \cdot (y_M + y_m)$ is calculated, which allows the corresponding coordinate $x_h$ to be found. A time value $t_1 \leq \min(x_M - x_h, x_h - x_m)$ can then be selected.

After having selected time value $t_1$, a selection is made of a sample sequence from the envelope of length $2 \times t_1$ centred on coordinate $x_h$. Finally, a least squares approximation is made of the selected sample segment of the envelope with a given function. This function may be affine, which allows the rising edge of the envelope to be estimated based on this function. At point y=0 of this affine function, the time of arrival of the first signals can thus be determined.

From the description that has just been given, those skilled in the art can devise multiple variants of the data communication method using pulse signals without departing from the scope of the invention defined by the claims. The receiver device may not have an integrated filter low noise amplifier, since the wide band antenna of the receiver device can already fulfil the filtering functions. The receiver device can be arranged to act as the transmitter device, and the transmitter device may be arranged to act as the receiver device so that a data exchange can occur.

The invention claimed is:

1. A wireless data communication method between a transmitter device having a first wide band antenna for transmitting ultra wide band coded data signals, and a receiver device having a second wide band antenna for receiving direct path and multiple path coded data signals, wherein the method comprises the steps of:
   (a) defining transmitted data by one or more sequences of N pulses where N is an integer number higher than 1, wherein the arrangement of N pulses of each sequence represents encoding of data relating to the transmitter device;
   (b) the receiver device receiving the N pulses of one pulse sequence of direct path and multiple path coded data signals, wherein the N pulses are each processed in one of N corresponding reception time windows, wherein each of the N reception time windows is positioned in time as a function of a known theoretical arrangement of the N pulses of the signals transmitted by the transmitter device; and
   (c) carrying out, in the receiver device, an operation of adding the N windows in a coherent manner before data demodulation so that added pulse amplitude level is higher than noise amplitude level captured by the receiver device;

(d) performing an operation of adding the N time windows before or after analogue-digital conversion of the analogue signals, and wherein the analogue signal pulses are sampled in the analogue-digital conversion stage by at least one sampling signal supplied by a signal processing unit, wherein the sampling signal has a frequency proportional to a frequency of a clock signal; and (e) calculating several absolute value maximum amplitude values for signals in time sub-windows of defined length $T_N$, wherein each of the sub-windows is time shifted in relation to each other by a determined time interval from the start of the reception time window to the end of said time window.

2. A wireless data communication method according to claim 1, wherein a first clock signal frequency for clocking various operations of the receiver device is proportionally adapted to a reference clock signal frequency of the transmitter device by controlling the pulse amplitude level of a final window adding the N windows until said amplitude level is maximised, wherein the reference clock signal frequency is used to generate ultra-wide band coded data signals.

3. A wireless data communication method according to claim 1, wherein the transmitter device transmits coded data signals, in which the data is coded by pulse position modulation of each sequence, or by pulse polarity or by phase modulation of each sequence, or by pulse position and polarity modulation of each sequence.

4. A wireless data communication method according to claim 1, wherein the coded data signals include a synchronisation frame allowing the receiver device to recognise the transmitter device and to be synchronised on said frame before demodulating the received data, wherein said synchronisation frame is composed of one or several sequences of N pulses of determined pulse repetition frequency.

5. A wireless data communication method according to claim 1, wherein the identical width of each of the N time windows is smaller than the reverse of the mean pulse repetition frequency of a sequence of coded data signals to be transmitted, and wherein said time window width is adapted to receive the pulses of the direct path and multiple path signals captured by the receiver device of width greater than 20 ns.

6. A wireless data communication method according to claim 1, wherein the time window signals are successively added and stored in at least one register of the signal processing unit.

7. A wireless data communication method according to claim 2, wherein each reception window, positioned in time in relation to the known theoretical arrangement of each pulse of the received data signals, is centered relative to a theoretical reference value or relative to the maximum added pulse amplitude of the direct path signals and multiple path signals captured by the receiver device.

8. A wireless data communication method according to claim 3, wherein the reference signals of identical polarity to the polarity of the coded signals received by the receiver device are correlated prior to addition of the resulting pulses of each time window.

9. A wireless data communication method according to claim 1, wherein the second signal processing unit includes means for adding the digital windows and means for estimating the time of arrival of the coded data signals, wherein before or after the time window addition operation is performed, the method further includes the steps of:

(f) estimating a noise amplitude level by selecting the minimum amplitude value from all the calculated amplitude values.

10. A wireless data communication method according to claim 1, wherein the method further includes the following steps:

(f) calculating a positive envelope of the signals of one time window by
  i. determining all the zero crossing positions $p_i$ of the time window signals;
  ii. determining the coordinates of the absolute value amplitude maximum in each interval from $p_i$ to $p_{i+1}$, with i ranging from 1 to I−1, wherein I is an integer number higher than 3; and
  iii. calculating the positive envelope by using a specific interpolation algorithm passing through the determined coordinates.

11. A wireless data communication method according to claim 10, wherein the method further includes the following steps:

(g) calculating the time of arrival of the first signals captured by the receiver device by
  i. calculating an amplitude threshold th based on the amplitude maximum of the envelope and an estimated noise amplitude level;
  ii. estimating the rising edge of the positive envelope where the threshold th is exceeded for the first time;
  iii. estimating the maximum local point of the positive envelope at the coordinates that directly follow the point where the positive envelope passes above the threshold th, and the minimum local point of the envelope at the coordinates that precede the point where the positive envelope passes above the threshold th;
  iv. calculating the intermediate coordinates between the minimum point and the maximum point;
  v. approximating at the position of intermediate coordinates a selected segment of samples of the positive envelope with a given function; and
  vi. determining the time of arrival of the first signals captured by the receiver device at the zero crossing or another value of the determined function.

12. A wireless data communication method according to claim 1, wherein the second signal processing unit includes control means for providing control signals to digital window addition means in order to modify the time or mean repetition frequency scale of N windows to be added from digital window addition means, wherein a re-sampling operation is carried out in the signal processing unit of the receiver device with a different re-sampling frequency from the sampling frequency of the analogue-digital conversion stage, wherein said re-sampling frequency generated by the control means is higher than the sampling frequency in order to increase precision for positioning purposes.

13. A receiver device for implementing the wireless data communication method according to claim 1, wherein the receiver device has a second wide band antenna for receiving direct path and multiple path coded data signals from a transmitter device, wherein the receiver device includes
  i. an oscillator stage delivering at least one clock signal at a defined frequency;
  ii. a signal processing unit connected to the oscillator stage;
  iii. an analogue-digital conversion stage for analogue signals relating to the coded data signals received by the second wide band antenna, wherein the signal processing unit includes time window addition means for coherently adding up the pulses of each of the N time windows before or after analogue-digital conversion of the analogue signals; and
  iv. demodulation means for demodulating data from digital signals after the time window addition means, wherein the analogue-digital conversion stage operates to sample the analogue signal pulses by at least one sampling signal supplied by the signal processing unit, wherein said sampling signal has a frequency proportional to the clock signal frequency of the receiver device.

14. A receiver device according to claim 13, wherein the clock signal frequency of the oscillator stage is proportionally adapted by the processing unit to a reference clock signal frequency of an oscillator stage of the transmitter device by controlling the pulse amplitude level of a final addition window of the N windows from the addition means until said amplitude level is maximised, wherein the oscillator stage is used to generate ultra-wide band coded data signals.

15. A receiver device according to claim 13, wherein the time window addition means receive digital signals from the analogue-digital conversion stage for adding up the digital windows.

16. A receiver device according to claim 13, wherein the time window addition means receive analogue data signals from the second wide band antenna in order to add up the analogue windows.

17. A wireless data communication method according to claim 11, wherein the given function is an affine function.

18. A wireless data communication method between a transmitter device having a first wide band antenna for transmitting ultra wide band coded data signals, and a receiver device having a second wide band antenna for receiving direct path and multiple path coded data signals, wherein the method comprises the steps of:
   (a) defining transmitted data by one or more sequences of N pulses where N is an integer number higher than 1, wherein the arrangement of N pulses of each sequence represents encoding of data relating to the transmitter device;
   (b) the receiver device receiving the N pulses of one pulse sequence of direct path and multiple path coded data signals, wherein the N pulses are each processed in one of N corresponding reception time windows, wherein each of the N reception time windows is positioned in time as a function of a known theoretical arrangement of the N pulses of the signals transmitted by the transmitter device; and
   (c) carrying out, in the receiver device, an operation of adding the N windows so that added pulse amplitude level is higher than noise amplitude level captured by the receiver device, wherein the receiver device further comprises a second signal processing unit that includes means for adding the digital windows and means for estimating the time of arrival of the coded data signals, wherein before or after the time window addition operation is carried out, the method further includes the steps of
   (d) calculating several absolute value maximum amplitude values for signals in time sub-windows of defined length $T_N$, wherein each of the sub-windows is time shifted in relation to each other by a determined time interval from the start of the reception time window to the end of said time window; and
   (e) estimating a noise amplitude level by selecting the minimum amplitude value from all the calculated amplitude values.

19. A wireless data communication method between a transmitter device having a first wide band antenna for transmitting ultra wide band coded data signals, and a receiver device having a second wide band antenna for receiving direct path and multiple path coded data signals, wherein the method comprises the steps of:
   (a) defining transmitted data by one or more sequences of N pulses where N is an integer number higher than 1, wherein the arrangement of N pulses of each sequence represents encoding of data relating to the transmitter device;
   (b) the receiver device receiving the N pulses of one pulse sequence of direct path and multiple path coded data signals, wherein the N pulses are each processed in one of N corresponding reception time windows, wherein each of the N reception time windows is positioned in time as a function of a known theoretical arrangement of the N pulses of the signals transmitted by the transmitter device; and
   (c) carrying out, in the receiver device, an operation of adding the N windows in a coherent manner before data demodulation so that added pulse amplitude level is higher than noise amplitude level captured by the receiver device, wherein the transmitter device includes
      i. a first oscillator stage delivering at least one first clock signal at a first defined frequency;
      ii. a first signal processing unit clocked by the clock signal provided by the first oscillator stage in order to modulate the data to be transmitted; and
      iii. a unit for shaping the N pulses of each sequence to be transmitted by the first wide band antenna of the transmitter device as a function of the data modulation provided by the first signal processing unit; and
   wherein the receiver device includes
      i. a second oscillator stage delivering at least one second clock signal at a second defined frequency;
      ii. a second signal processing unit connected to the second oscillator stage; and
      iii. an analogue-digital conversion stage for analogue signals relating to the coded data signals received by the second wide band antenna; and
   (d) calculating several absolute value maximum amplitude values for signals in time sub-windows or defined length $T_N$, wherein each of the sub-windows is time shifted in relation to each other by a determined time interval from the start of the reception time window to the end of said time window.

20. A wireless data communication method between a transmitter device having a first wide band antenna for transmitting ultra wide band coded data signals, and a receiver device having a second wide band antenna for receiving direct path and multiple path coded data signals, wherein the method comprises the steps of:
   (a) defining transmitted data by one or more sequences of N pulses where N is an integer number higher than 1, wherein the arrangement of N pulses of each sequence represents encoding of data relating to the transmitter device;
   (b) the receiver device receiving the N pulses of one pulse sequence of direct path and multiple path coded data signals, wherein the N pulses are each processed in one of N corresponding reception time windows, wherein each of the N reception time windows is positioned in time as a function of a known theoretical arrangement of the N pulses of the signals transmitted by the transmitter device; and
   (c) carrying out, in the receiver device, an operation of adding the N windows in a coherent manner before data demodulation so that added pulse amplitude level is higher than noise amplitude level captured by the receiver device, wherein the transmitter device includes
- i. a first oscillator stage delivering at least one first clock signal at a first defined frequency;
- ii. a first signal processing unit clocked by the clock signal provided by the first oscillator stage in order to modulate the data to be transmitted; and
- iii. a unit for shaping the N pulses of each sequence to be transmitted by the first wide band antenna of the transmitter device as a function of the data modulation provided by the first signal processing unit; and wherein the receiver device includes
- i. a second oscillator stage delivering at least one second clock signal at a second defined frequency;
- ii. a second signal processing unit connected to the second oscillator stage; and
- iii. an analogue-digital conversion stage for analogue signals relating to the coded data signals received by the second wide band antenna, wherein the method further comprises the steps of:

(d) performing an operation of adding the N time windows before or after analogue-digital conversion of the analogue signals, and wherein the analogue signal pulses are sampled in the analogue-digital conversion stage by at least one sampling signal supplied by the second signal processing unit, wherein the sampling signal has a frequency proportional to the second frequency of the second clock signal; and (e) calculating several absolute value maximum amplitude values for signals in time sub-windows of defined length $T_N$, wherein each of the sub-windows is time shifted in relation to each other by a determined time interval from the start of the reception time window to the end of said time window.

* * * * *